US006585373B2

(12) United States Patent
Evans et al.

(10) Patent No.: US 6,585,373 B2
(45) Date of Patent: *Jul. 1, 2003

(54) OPHTHALMIC LENSES UTILIZING POLYETHYLENE TEREPHTHALATE POLARIZING FILMS (75) Inventors: Russell E. Evans, Chino Hills, CA (US); Thomas Balch, Rancho Palos Verdes, CA (US); Edward A. Beeloo, Torrance, CA (US); Nancy L. S. Yamasaki, Long Beach, CA (US)

(73) Assignee: Younger Mfg. Co., Torrance, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 09/832,083

(22) Filed: Apr. 9, 2001

(65) Prior Publication Data

US 2001/0028436 A1 Oct. 11, 2001

Related U.S. Application Data (63) Continuation-in-part of application No. 09/475,424, filed on Dec. 29, 1999, now Pat. No. 6,220,703.

(51) Int. Cl.$^7$ .............................. G02C 7/12; G02C 7/10
(52) U.S. Cl. ...................... 351/163; 351/166; 351/177
(58) Field of Search ................................. 351/163, 177, 351/166

(56) References Cited

U.S. PATENT DOCUMENTS

| 3,051,054 A | 8/1962 | Crandon ........................ 88/65 |
| 3,833,289 A | 9/1974 | Schuler ...................... 350/155 |
| 3,846,013 A | 11/1974 | Cohen ......................... 350/147 |
| 3,940,304 A | 2/1976 | Schuler ...................... 156/245 |
| 4,090,830 A | 5/1978 | Laliberte .................... 425/117 |
| 4,268,127 A | 5/1981 | Oshima et al. ............. 350/337 |
| 4,274,717 A | 6/1981 | Davenport .................. 351/169 |
| 4,418,992 A | 12/1983 | Davenport et al. ......... 351/169 |
| 4,427,741 A | 1/1984 | Aizawa et al. .............. 428/332 |
| 4,617,207 A | 10/1986 | Ueki et al. ..................... 428/1 |
| 4,756,953 A | 7/1988 | Utsumi ........................ 428/220 |
| 4,824,882 A | 4/1989 | Nakamura et al. ............ 524/89 |

(List continued on next page.)

OTHER PUBLICATIONS

Rodriguez, Ferdinand, "Principles of Polymer Systems," *Hemisphere Publishing Corporation*, Third Edition, pp. 21–27 and 483–489 (1989).

Hollander, A. et al. "The Influence of Vacuum–Ultraviolet Radiation on Poly(ethylene terephthalate)," *Journal of Polymer Science Part A: Polymer Chemistry*, vol. 34, 1511–1516 (1996).

Plastics Engineering Handbook of the Society of the Plastics Industry, Inc., Third Edition, *Reinhold Publishing Corporation*, New York, pp. 492–493 (1960).

Liston, Edward M., "Plasma Treatment for Improved Bonding: A Review," 35$^{th}$ Sagamore Army Materials Research Conference, pp. 199–218 (1988).

Glocker, David A. et al., "Plasma Sources for Polymer Surface Treatment," *Handbook of Thin Film Process Technology* (1996).

Primary Examiner—Scott J. Sugarman
(74) Attorney, Agent, or Firm—Sheppard, Mullin, Richter & Hampton LLP; James R. Brueggemann (57) ABSTRACT An optical-quality part such as an ophthalmic lens is provided having a PET polarizing film integrally bonded thereto and, optionally, a hard coating integrally bonded to either the PET polarizing film or to the optical construct containing the PET polarizing film. In a preferred construction, the lens material or film may be surface treated, either physically and/or chemically, for integrally bonding the film to the lens material. Similarly, in another preferred construction, the film may be physically and/or chemically surface treated for integrally bonding a hard coating to the PET film.

31 Claims, 3 Drawing Sheets

U.S. PATENT DOCUMENTS

| | | | |
|---|---|---|---|
| 4,873,029 A | 10/1989 | Blum | 264/1.3 |
| 5,049,427 A | 9/1991 | Starzewski et al. | 428/40 |
| 5,051,309 A | 9/1991 | Kawaki et al. | 428/332 |
| 5,059,356 A | 10/1991 | Nakamura et al. | 252/585 |
| 5,071,906 A | 12/1991 | Tanaka et al. | 524/557 |
| 5,286,419 A | 2/1994 | van Ligten et al. | 264/1.3 |
| 5,434,707 A | 7/1995 | Dalzell et al. | 359/485 |
| 5,641,372 A | 6/1997 | Okuno | 156/230 |
| 5,702,813 A | 12/1997 | Murata et al. | 428/332 |
| 5,718,849 A | 2/1998 | Maus et al. | 264/2.2 |
| 5,751,481 A | 5/1998 | Dalzell et al. | 359/845 |
| 5,757,459 A | 5/1998 | Bhalakia et al. | 351/168 |
| 5,800,744 A | 9/1998 | Munakata | 264/1.7 |
| 5,808,721 A | 9/1998 | Wood et al. | 351/159 |
| 5,827,614 A | 10/1998 | Bhalakia et al. | 428/411.1 |
| 5,830,578 A | 11/1998 | Ono et al. | 428/446 |
| 5,882,774 A | 3/1999 | Jonza et al. | 428/212 |
| 5,926,310 A | 7/1999 | Tamura et al. | 359/350 |
| 5,965,247 A | 10/1999 | Jonza et al. | 428/212 |
| 5,991,072 A | 11/1999 | Solyntjes et al. | 359/361 |
| 6,220,703 B1 * | 4/2001 | Evans et al. | 351/163 |
| 6,413,641 B1 * | 7/2002 | Yamasaki et al. | 428/412 |

* cited by examiner

OPHTHALMIC LENSES UTILIZING POLYETHYLENE TEREPHTHALATE POLARIZING FILMS

CROSS-REFERENCE TO RELATED APPLICATION

This application is a continuation-in-part of U.S. patent application Ser. No. 09/475,424 filed Dec. 29, 1999 now U.S. Pat. No. 6,220,703, incorporated by reference as if fully set forth herein.

BACKGROUND OF THE INVENTION

The field of the present invention relates to optical-quality parts such as ophthalmic lenses, and particularly to an ophthalmic lens utilizing a polarizing film.

A variety of ophthalmic lenses are known as described in, for example, U.S. Pat. Nos. 4,418,992 and 4,274,717, each of these disclosures hereby incorporated by reference as if fully set forth herein. Such lenses may comprise a number of different types of materials ranging from inorganic to thermoset plastics, such as allyl diglycol carbonate sold under the CR-39® trademark of PPG Industries, Inc. ("CR-39®"), to more recent formulations using thermoplastic materials, such as polycarbonate ("PC").

Commonly, polarizers used in hard resin thermoset lenses or polycarbonate thermoplastic lenses are based on polyvinylalchohol ("PVA") films imbued with a polarizing material. For thermoset lenses, the polarizing film is either adhesively bonded to a lens substrate, or it is placed within a mold assembly and the liquid resin mixture placed around it (sequentially or simultaneously) to form the lens. For thermoplastic lens production, the film is commonly part of a multi-layer construction (often referred to as a wafer) designed for better rigidity and thermal stability. Often this construction involves joining or encapsulating the polarizer with other polymers such as PC or cellulose acetate butyrate ("CAB") by co-extrusion, lamination, calendering, etc.

There are several limitations with these approaches. The common PVA base film is temperature-sensitive and therefore difficult to process with thermoplastics. In thermoplastic lens manufacturing, for example, monomer or polymeric pellets are heated past their softening point (for PC, above 230° C.), and injected into a mold form. Conventional polarizer films comprising PVA or similar polymers cannot withstand these temperatures. For instance, PVA has its glass transition temperature ("$T_g$") between 90–95° C., and softens with decomposition at approximately 200° C. Therefore, not only will the PVA film lose its shape, but it will also lose physical integrity (color, polarization efficiency, mechanical strength, etc.) at typical molding temperatures.

In addition to the temperature-sensitive film, the dyes or polarizing commonly agents used therein are also temperature-sensitive. The temperature-sensitivity of the common polarized film and the dyes or polarizing agents used therein can cause severe non-uniformity or non-reproducibility, adversely affecting either the optical and cosmetic quality of a given lens or lot-to-lot consistency.

The conventional approach to solve the temperature-sensitivity limitation of common polarizers has consistently been to clad the weak polarizing film with another more resistant plastic to survive the molding process. Such cladding is typically done by adhesively joining the film with at least one support layer or interposing the film between layers and adhesively combining the film to the support layers, as described for example in U.S. Pat. No. 5,051,309, which is incorporated by reference as if fully set forth herein.

Common adhesively joined products, however, are susceptible to delamination during either the lens molding process (heat and pressure excursions) or subsequent processing to form finished ophthalmic eyewear. Such delamination is a problem for thermoplastic molding, as well as thermoset resin lenses that sometimes depend upon adhesives to join the polarizer to the solid plastic lens substrate.

One reference, U.S. Pat. No. 5,059,356, which is incorporated by reference as if fully set forth herein, discloses a polarized film of polyethylene terephthalate ("PET"). This material has several advantages over PVA, including affordability, significantly better heat, moisture, and solvent resistance, and good mechanical stability. It is also more stable to ultra-violet radiation (UV), which is especially useful for lens production and coating processes with UV curing cycles.

The present inventors recognized that an ophthalmic lens utilizing PET film might offer advantages over an ophthalmic lens utilizing current PVA film if the PET film could be reliably incorporated into ophthalmic lens manufacture. Despite the potential advantages, the present inventors are unaware of effective use of PET film in ophthalmic lenses. Its absence of incorporation into ophthalmic lens manufacture can be attributed to a number of different reasons.

The primary reason is due to PET's chemical inertness. A secondary reason includes PET's relatively low degree of optical quality, which is not able to match or accommodate ophthalmic lenses.

With respect to its chemical inertness, the present inventors have experimented with PET film and noted that PET cannot be reliably adhered within or to the lens and additional coatings cannot be reliably adhered to the PET film. In particular, the present inventors discovered that simple adhesive bonding (application of liquid adhesives or glues) is not acceptable for ophthalmic lenses that will undergo additional processing, such as grinding to prescription strength or be subjected to additional coating processes for mechanical or optical enhancement. Accordingly, an ophthalmic lens and method or process of utilizing PET film to form the lens, wherein the film may be bonded to the lens substrate without additional plastic supports, without losing its required physical properties, and with high adhesion, is desired.

SUMMARY OF THE INVENTION

The preferred embodiments relate to an optical-quality part comprising an optical construct having a PET polarizing film integrally bonded thereto and, optionally, a hard coating integrally bonded to the PET polarizing film after it has been bonded to the optical construct. Such an optical-quality part includes, but is not limited to, semi-finished, finished prescription and non-prescription lenses, facemasks, shields, goggles, visors, displays or window devices, and the like.

In a preferred construction, the PET film may be surface treated, either physically and/or chemically, for integrally bonding the film to the optical construct such as a lens substrate. This may involve integrally bonding the film to an existing optical construct, or causing integral bonding to occur as the optical construct is formed against or around the PET polarizing film.

Similarly, in another preferred construction, the film may be physically and/or chemically surface treated for integrally bonding the hard coating to the PET film.

Various other embodiments may utilize some but not all of the above elements, or may include additional refinements, while obtaining the benefit of an optical-quality polarized part such as an ophthalmic lens utilizing PET film.

BRIEF DESCRIPTION OF THE DRAWINGS

The various objects, features, and advantages of the present inventions may be better understood by examining the Detailed Description of the Preferred Embodiments found below, together with the appended figures, wherein.

DETAILED DESCRIPTION OF THE PREFERRED EMBODIMENTS

The preferred embodiments will now be described with respect to the drawings. To facilitate the description, any numeral identifying an element in one figure will represent the same element when used in any other figure.

Figures 1, 2, 3:
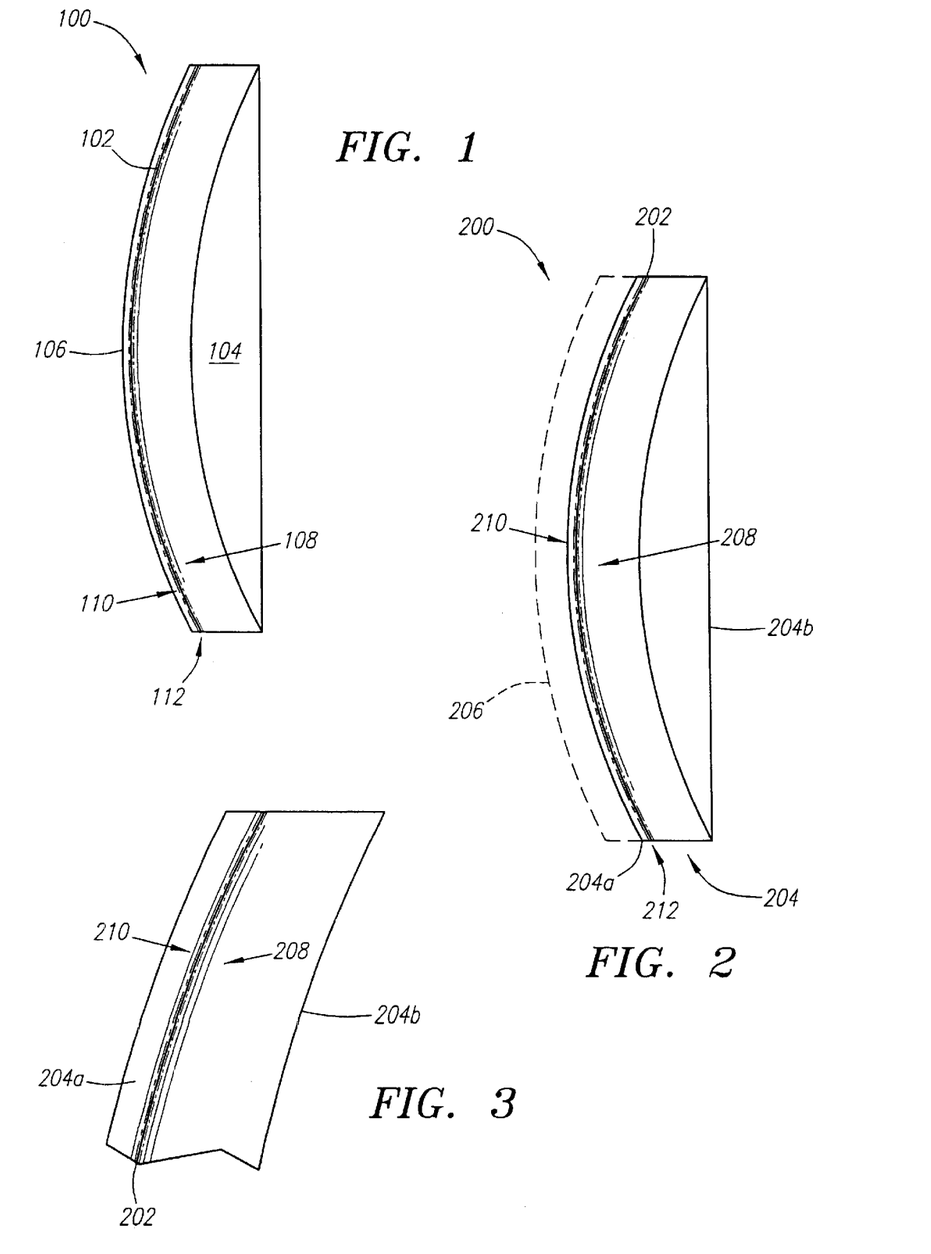
FIG. 1 shows an ophthalmic thermoplastic lens utilizing PET polarizing film, wherein the lens is constructed according to a preferred embodiment.
FIG. 2 shows an ophthalmic thermoset lens utilizing PET polarizing film, wherein the lens is constructed according to a preferred embodiment.
FIG. 3 shows a detailed view of the integral bonding that occurs between the PET polarizing film and the lens substrate, and particularly illustrates the integral bond between the PET film within the thermoset lens substrate shown in FIG. 2.

FIG. 1 shows an optical-quality part 100 comprising an optical construct 104 and a polarizer 102 bonded thereto. FIG. 1 illustrates the optical-quality part 100 as an ophthalmic thermoplastic lens utilizing PET polarizing film 102, wherein the lens 100 is constructed according to a preferred embodiment.

Although FIG. 1 shows the optical-quality part 100 as a polarized ophthalmic thermoplastic lens, the optical-quality part 100 need not be limited as such. To this end, the optical-quality polarized part 100 shown in FIG. 1 may include semi-finished, finished prescription and non-prescription lenses, facemasks, shields, goggles, visors, displays, window devices, or the like.

As FIG. 1 illustrates the optical-quality plastic part 100 as an ophthalmic lens 100, the optical construct 104 is a lens substrate or lens material having a PET polarizing film 102 integrally bonded thereto and a hard coating 106 integrally bonded to the film 102 after it has been bonded to the lens substrate 104. As disclosed in detail below, the film may be surface treated, either physically and/or chemically, to effect an integral bond 108 (such a bond being shown in detail in FIG. 3 with respect to a thermoset lens) between the film 102 and the lens substrate 104, i.e., the film 102 is unsupported and directly bonded to the substrate 104. Similarly, the film 102 may be physically and/or chemically surface treated to effect an integral bond 112 between the hard coating 106 and the film 102.

FIG. 2 shows an optical-quality part and particularly an ophthalmic thermoset lens 200 utilizing PET polarizing film 202, wherein the lens 200 is constructed according to a preferred embodiment. Although FIG. 2 shows the optical-quality part 200 as a polarized ophthalmic thermoset lens, the optical-quality part 200 need not be limited as such. To this end, the optical-quality polarized part 200 shown in FIG. 2 may include semi-finished, finished prescription and non-prescription lenses, facemasks, shields, goggles, visors, displays, window devices, or the like.

As with the thermoplastic lens illustrated in FIG. 1, the optical-quality part illustrated as a thermoset lens 200 in FIG. 2 includes a lens substrate or material 204 having a PET polarizing film 202 integrally bonded thereto. Unlike film 102 that is bonded at the front surface 112 of the lens substrate 104, film 202 is bonded near the front surface 212 of the lens substrate 204. In this manner, film 202 is interposed between first and second members 204a, 204b of substrate 204. As the first member 204a of the lens material 204 protects the film 202, there may be no need to hardcoat it. However, to protect the first member 204a from abrasion and undue wear, member 204a may optionally be hardcoated. Thus, as the hard coating 206 is optional, it is shown in dashed lines.

Similar to the integral bond between the thermoplastic lens material 104 and PET film 102, both sides of the PET film 202 may be surface treated, either physically and/or chemically, to effect an integral bond 208 between the film 202 and the second substrate member 204b and an integral bond 210 between the film 202 and the first substrate member 204a. Bonds 208, 210 are shown in detail in FIG. 3. Should a hard coat be desired, the first member 204a of substrate 204 may be surface treated to improve adhesion of the hard coating 206 to the member 204a.

As noted above, the lens substrate or material may comprise a thermoset material or a thermoplastic material. With respect to thermoset materials, the preferred materials comprise polymers or pre-polymer mixtures that produce diethylene glycol bis (allyl carbonate) or diallyl diglycol carbonate, such as CR-39® or PPG, or Akzo Nobel brand NS205. The lens substrate may comprise other thermoset materials such as polymers of 1,3 butylene glycol dimethacrylate, acrylonitrile, allyl methacrylate, ethoxymethyl methacrylate, ethylene glycol dimethacrylate, polyethylene glycol dimethacrylate; ally esters; co-polymers of allyl esters with styrene or vinyl type monomers, such as diallyl maleate, diallyl phthalate, diallyl diglycol carbonate, methallyl methacrylate, etc.; polyurethanes; and high index copolymers containing, e.g., vinyl functionality, isocyanates, urethanes, sulfur-containing aromatic vinyl compounds, and bromine-containing aromatic acrylic compounds.

With respect to thermoplastic materials, the preferred materials comprise PC resin such as that sold by Bayer, Inc. of Pittsburgh, Pa. under their trademarks Makrolon® DPI-1821 or 1815, or Lexan® OQ2720 manufactured by General Electric. The lens substrate may comprise other thermoplastic materials such as polysulfones, polyethersulfones, polyamides, polystyrenes; and mixtures of polycarbonate and polyurethanes, polyesters, polysulfones, polystyrenes, amorphous polyolefins, and acrylics.

It is preferred that the PET film be of very high optical quality to match ophthalmic standards, such as Developmental Film 99-04 distributed by R&S Enterprises of Yokohama, Japan with a polarizing efficiency of at least 96.3% and a transmission average (400–700 nm) of 14–18%. The present inventors currently prefer the un-annealed form to the standard annealed form of Developmental Film 99-04 distributed by R&S Enterprises.

The PET film may further comprise a crystalline or semi-crystalline naphthalene dicarboxylic acid, such as polyethylene naphthalate polyester or a copolymer derived from ethylene glycol, naphthalene dicarboxylic acid, and some other acids such as terephthalate. These may be combined with PET as thin, multilayered polymeric materials, combined reflective and dichroic polarizers, or films of mixed polymeric phases such as those described in U.S. Pat. Nos. 5,882,774; 6,096,375; and 5,867,316, and references respectively cited therein, all of which are incorporated herein by reference.

The hard coating may comprise an UV-cured hardcoat, such as SDC-1175, for thermoplastic lenses and an LTI-UV cured hardcoat, such as LTI-SHC-175Y, 33% solids, for thermoset lenses. The hard coating may alternately comprise thermally cured coatings such as SCL-145.40.NT.

Figures 4, 5:
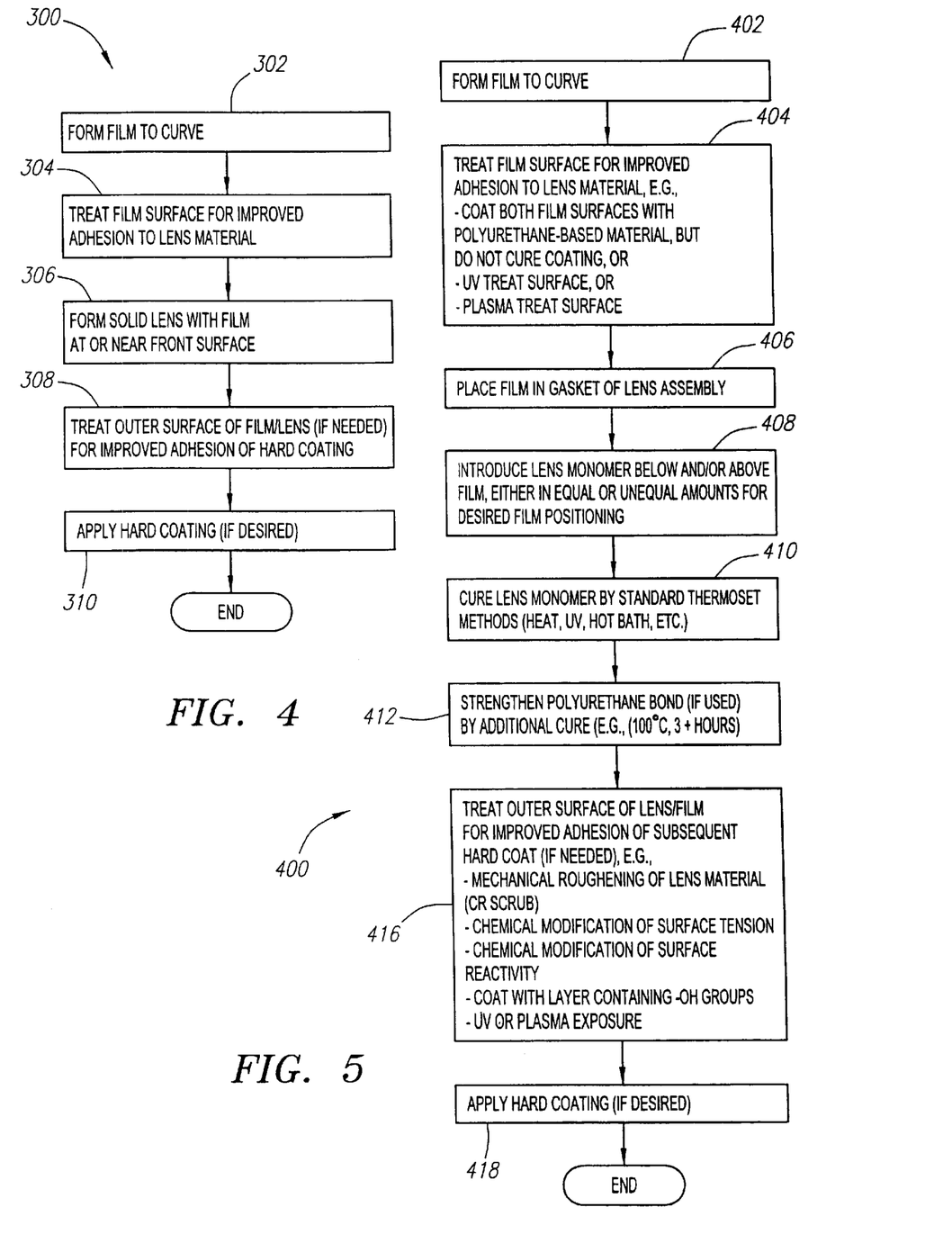
FIG. 4 is a flowchart illustrating the general process of using PET polarizing film in ophthalmic lenses.
FIG. 5 is a flowchart illustrating thermoset lens forming that utilizes PET polarizing film according to a preferred embodiment.

Turning in detail to FIG. 4, a general process 300 of using PET polarizing film in ophthalmic lenses according to the preferred embodiments includes the first step of "Form film to curve" 302 for forming the film to curve or fit the desired shape of the lens substrate or material. To this end, general process 300 is generally applicable for use with either thermoset or thermoplastic substrates or materials. The film may be curved or formed by techniques such as those disclosed in U.S. patent application Ser. No. 09/569,479 filed May 12, 2000 or techniques commonly known to those skilled in the art as described in, for example, U.S. Pat. No. 5,434,707, each of the above-identified disclosures hereby incorporated by reference as if fully set forth herein.

After shaping or curving the film, due to the inert properties of the PET and its inability to reliably adhere to another material, the next step includes "Treat film surface for improved adhesion to lens material" 304. For "integral bonding" (interpenetrated bonding or bonding at the molecular level) of the materials to occur, the film surface should be prepared or treated.

Different surface treatments or coatings may be necessary to achieve the best adhesion with different materials (e.g., lens material vs. coating material). This point may be especially true for chemical bonding, which requires compatible reactive sites. In other words, when PET is subjected to UV or plasma treatments, a common chemical change generally involves the formation of either radicals or phenolic groups (aromatic rings with —OH groups) on the treated surface. Depending on the next layer for adhesion, these groups can be effective for strong bonding or can even repel the new material. With respect to the general process 300 as illustrated in FIG. 4, these groups are generally beneficial species for improved bonding to subsequent thermal and UV curing hard coatings. Because of the molecular structure of CR39®-type hard resins and PC, UV and plasma treatment may also enhance adhesion to these materials as well.

Accordingly, depending on the type of materials involved, the type of surface "treatment" of the film may vary. For example, a polyurethane coating may be applied by itself to the film to integrally bond with the lens substrate. Prior to the polyurethane coating, the film surface may be prepared or treated by using physical and/or chemical treatments. The physical treatment may include, for example, scrub roughening of the surface to achieve a "Velcro" effect.

Alternatively or in combination therewith, the film may also be chemically prepared or treated for bond-breaking and bond formation between the surface and the subsequent layers by coating the film with a reactive layer, e.g., the film may be coated with a layer having reactive groups or the film may be coated with a layer containing —OH groups.

Thus, in order to increase the bonding of the inert PET film to the lens substrate, physical and/or chemical treatments may be applied to the film prior to the application of a polyurethane coating if the coating is used at all. Although chemical bonds are generally stronger than physical bonds due to the reformed direct linkages between structures, rather than only depending on tangling of polymer chains, physical treatment can demonstrably increase adhesion. However, for even greater bond adhesion, physical treatment may be followed by chemical treatment. Further details of surface treatments and chemistries for improved bonding can also be found in U.S. application Ser. No. 09/567,711, which application is also incorporated by reference as if fully set forth herein.

As shown in FIG. 4, after step 304 there may be the step of "Form solid lens with film at or near front surface" 306. If thermoset lens forming is involved, those skilled in the art may use techniques commonly known to them as described in, for example, U.S. Pat. No. 5,286,419 and Applicant's ABO-approved presentation on sunwear, copyright 1999, each of these disclosures hereby incorporated by reference as if fully set forth herein. If thermoplastic lens forming is involved, those skilled in the art may use techniques commonly known to them as described in, for example, U.S. Pat. No. 5,051,309, which disclosure is hereby incorporated by reference as if fully set forth herein.

After step 306, the next step in the overview of the general ophthalmic manufacturing process 300 may include "Treat outer surface of film/lens (if needed) for improved adhesion of hard coating" 308. In this step, the film surface may be treated, physically and/or chemically, for integrally bonding the film to the hard coating. Once the film has been treated, a hard coating may be applied as illustrated in step "Apply hard coating (if desired)" 310.

Turning in detail to FIG. 5, a flowchart illustrates thermoset lens forming 400 that utilizes PET polarizing film according to a preferred embodiment. As shown therein, the first step includes "form film to curve" 402. Similar to the general process 300 flowchart illustrated in FIG. 4, the film may be formed or shaped using conventional techniques known those skilled in the art.

The next step may involve prepping the surface of the film to allow the film to integrally bond to the lens substrate. As shown in FIG. 5, the step is "Treat film surface for improved adhesion to lens material, e.g.,—coat both film surfaces with polyurethane-based material, but do not cure coating, or—UV treat surface, or—plasma treat surface" 404.

As this step illustrates, both sides of the film or both film surfaces may be coated or dipped with an uncured polyurethane-based material or UV treated or plasma treated. Although this step does not expressly illustrate near UV to visible irradiation treatment, it is understood that the same or similar effects achieved by UV treatment may be reached in some instances by controlled irradiation at other wavelengths (e.g., near UV, vacuum UV, or visible wavelengths). Similarly, plasma treatments can include atmospheric and vacuum plasma treatments.

With respect to the UV treatment, conventional techniques known to those skilled in the art may be employed such as that described in, for example, "The Influence of Vacuum-Ultraviolet Radiation on Poly(ethylene terephthalate)," *Journal of Polymer Science: Part A: Polymer Chemistry*, Vol. 34, pp. 1511–1516 (1996), which disclosure is hereby incorporated by reference as if fully set forth herein. With respect to the plasma treatment, conventional techniques known to those skilled in the art may be employed such as that described in, for example, "Plasma Treatment for Improved Bonding: A Review," *J. Adhesion*, Vol. 30, pp. 199–218 (1989) and "Plasma Sources for Polymer Surface Treatment," *Handbook of Thin Film Process Technology* (1996), which disclosures are hereby incorporated by reference as if fully set forth herein.

As shown in FIG. 5, after step 404, the next steps may be "Place film in gasket of lens assembly" 406, "Introduce lens monomer above and below film, either in equal or unequal amounts for desired film positioning" 408, and "Cure lens monomer by standard thermoset methods (heat, UV, hot bath, etc.)" 410. If polyurethane has been used, the polyurethane bond is preferably strengthened for at least three hours as illustrated in the step of "Strengthen polyurethane bond (if used) by additional cure (e.g., 100° C., 3+hours)" 412.

Assuming polyurethane was used and further strengthened in step 412, the next step, step 416, optionally includes treating the outer surface of the lens to improve adhesion of an optionally applied hard coating. The surface treatment of the lens may be physical or chemical treatments, or a combination thereof, which may include mechanical roughening of the lens substrate, chemical modification of the surface tension, chemical modification of the surface reactivity, or UV or plasma exposure.

Step 416 is illustrated in FIG. 5 as "Treat outer surface of lens (if needed) for improved adhesion of subsequent hard coat, e.g.,—Mechanical roughening of lens material (CR scrub)—Chemical modification of surface tension—Chemical modification of surface reactivity—Coat with layer containing —OH groups—UV or plasma exposure". The last step in the preferred thermoset lens forming process illustrated in FIG. 5 includes the step of "Apply hard coating (if desired)" 418.

Figure 6:
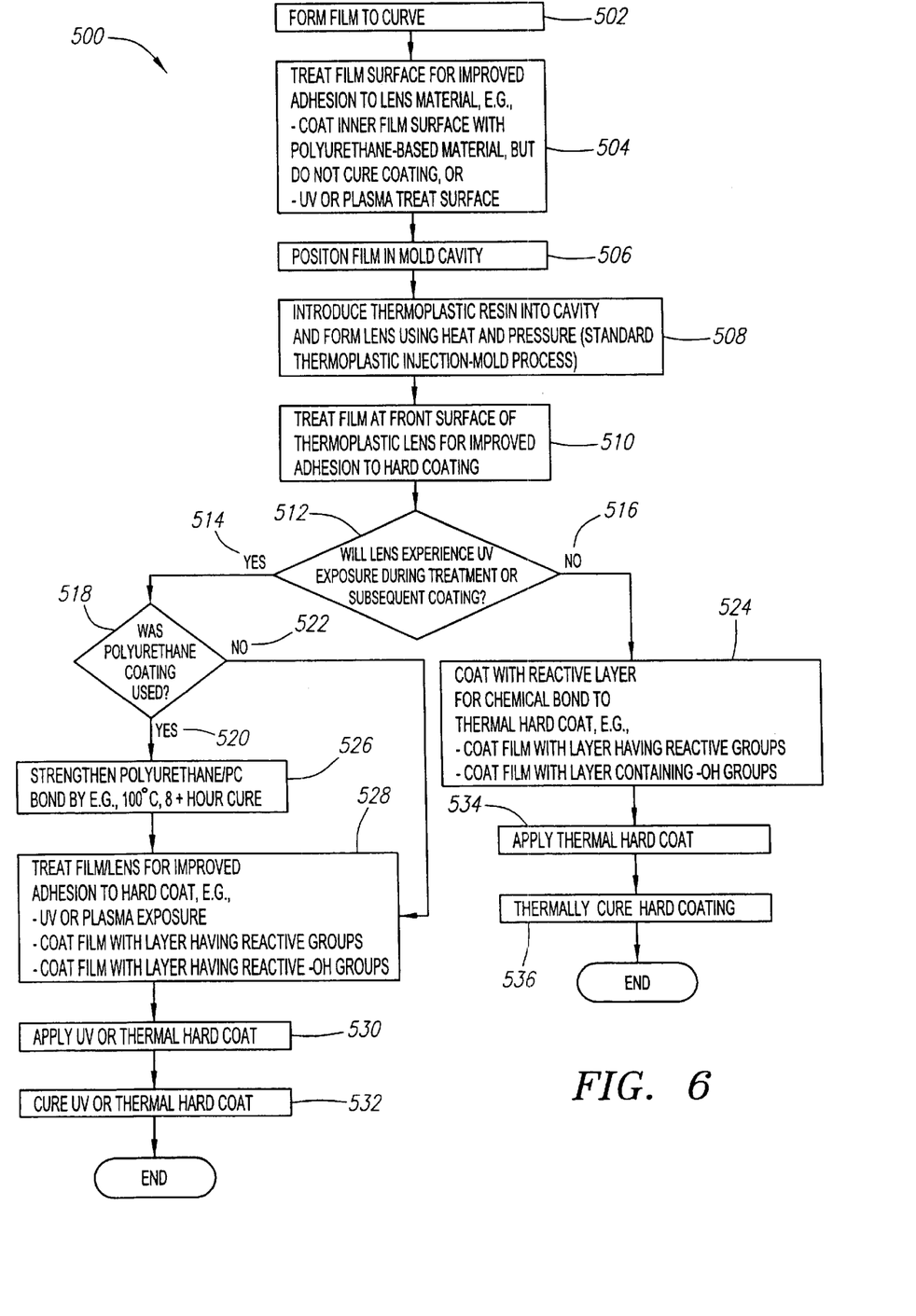
FIG. 6 is a flowchart illustrating thermoplastic lens forming that utilizes PET polarizing film according to a preferred embodiment.

FIG. 6 is a flowchart illustrating thermoplastic lens forming 500 that utilizes PET polarizing film according to a preferred embodiment. As shown therein, the first step of "Form film to curve" 502 is generally similar to steps 302, 402, respectively illustrated in FIGS. 4 and 5. The next step of "Treat film surface for improved adhesion to lens material, e.g.,—coat inner film surface with polyurethane-based material, but do not cure coating, or—UV or plasma treat surface" 504 is directed to preparing the inner surface of the film facing the lens substrate, such as substrate 104, for integral bonding thereto.

The next steps of "Position film in mold cavity" 506 and "Introduce thermoplastic resin into cavity and form lens using heat and pressure (standard thermoplastic injection-mold process)" 508 generally involve conventional thermoplastic injection-molding techniques with the caveat that one preferably carefully manipulates the heat and pressure so as not to burn the film. In other words, the $T_g$ of PET is 69° C. and its melting point is 250–270° C. PVA has a $T_g$ of 90–95° C. and decomposes (instead of melting) at approximately 200° C. PC has a $T_g$ of 145° C. and melts at 230° C.

Therefore, when molding with PC, one is usually operating near 230° C. This temperature may cause severe damage to a free-standing or unsupported film, but could also affect the optical properties of a PET film (because of the low $T_g$). Carefully controlling the temperature of molding protects the PET from burning while still allowing the PC to flow smoothly within the mold. Typically, this control involves dropping the molding temperatures approximately 30° F. for all stages of the molding process.

Once the solid thermoplastic lens has been formed in step 508, the next step of "Treat film at front surface of thermoplastic Lens for improved adhesion to hard coating" 510 involves prepping the outer surface of the film for integrally bonding the lens to the hard coating. This step may be effected in one of two ways, depending on whether the lens will experience UV exposure as illustrated in the step of "Will lens experience UV exposure during treatment or subsequent coating" 512.

If "YES," as shown in step 514, and if polyurethane was used, as shown in steps "Was polyurethane coating used?" 518 and "YES" 520, then the polyurethane/thermoplastic material bond should be strengthened as illustrated in the step of "Strengthen polyurethane/PC bond by e.g., 100° C., 8+hour cure" 526. Once the bond has been strengthened for more interpenetrated adhesion, the outside surface of the film may optionally be treated to integrally bond the optional hard coating to the film as shown in the step of "Treat film/lens for improved adhesion to hard coat, e.g.,—UV or plasma exposure—Coat film with layer having reactive groups—Coat film with layer having reactive —OH groups" 528.

Step 528 may be effected, for example, by dipping the film in a diluted caustic wash (e.g., less than 5% NaOH) to change the surface reactivity and surface tension of the film. Alternatively, or in combination therewith, the film may be treated via the application of a thin coating of polysiloxanes and more particularly with organosilanes such as tetraethoxysilane. The coating may then be partially polymerized with UV irradiation or heat.

Once step 528 is accomplished, the hard coating may be applied and then cured as shown in the steps of "Apply UV or thermal hard coat" 530 and "Cure UV or thermal hard coat" 532.

Returning to step 512, if the lens will not experience UV exposure during treatment or subsequent coating, the outer surface of the film is then preferably chemically treated for optionally bonding a hard coating thereto, as shown in the steps of 516 and "Coat with reactive layer for chemical bond to thermal hard coat, e.g.,—Coat film with layer having reactive groups—Coat film with layer containing —OH groups" 524 to change the surface reactivity or surface tension of the film. Alternatively, or in combination therewith, the film may be treated via application of a thin coating of polysiloxanes or polysiloxane precursors. This coating may then be partially polymerized with heat.

Once treated, the hard coating may be applied and cured for integrally bonding the hard coating to the film as shown in the steps of "Apply thermal hard coat" 534 and "Thermally cure hard coating" 536.

The limitations inherent with attempting to bond inert PET film and the advantages allowed by the preferred embodiments are more particularly described in the following examples that are intended as illustrations only since modifications and variations within the scope of the general disclosure will be apparent to those skilled in the art.

Examples 1 and 2 demonstrate the limitations inherent with attempting to bond inert PET film, and respectively demonstrate the limitations pertaining to thermoplastic lens forming and thermoset lens forming.

EXAMPLE 1

A 4D (diopters of lens power, referenced to a refractive index of 1.53) curved PET film was positioned within a 4D single vision lens insert cavity of a polycarbonate-molding machine. Standard PC molding conditions were used to inject PC into the same cavity to form a polarized single vision lens.

Adhesion of the lens/film combination was not consistently acceptable, as measured by cutting a narrow cross-section of the lens, scoring into the lens from the back almost to the front surface, and then breaking the lens along the score line to determine where adhesion is lost. In a few instances, the intrinsic cohesiveness of the PET was exceeded before the lens delaminated. This means that a very strong bond was achieved. However, when additional lenses were made with the identical process and tested in the same manner, adhesion failure often occurred at the interface between the PET and the back surface of the lens.

Furthermore, the adhesion of subsequent hard coats was also inconsistent. A wet chemical hard-coat (approximately 4 microns thick) was applied by standard spin coating techniques, then cured by infrared and UV light exposure for 25 seconds. This polarized lens was not compromised in color or polarizing efficiency by exposure to ultraviolet (UV) light during the hard coating process. However, the adhesion of the hard coat to the PET surface, as tested by the ASTM method of cross-hatch scoring of the hard coated surface, pressing 3M brand 810 tape firmly across the cut surface, and snap tape testing, showed highly variable results. Using the identical molding process, some lenses showed no coating removal, while others showed partial or entire removal of coating in the tested area.

EXAMPLE 2

A 4D curved PET film was positioned in a thermoset lens casting assembly (two glass lens surface molds, spaced apart from each other and held in that configuration by an outer plastic gasket). Standard lens casting procedures were used to form a hard resin lens around the PET film. Adhesion as measured by the cross-sectioning test described above showed moderate adhesion, with less than 20% delamination between the PET film surface and the resin lens interfaces.

EXAMPLE 3

Example 3 demonstrates the advantages allowed by treating the surface of the PET film prior to forming the solid lens with the film at or near the front surface of the lens substrate. Example 3 is directed to thermoplastic lens forming. However, as both sides of the PET film may be coated or dipped with polyurethane in thermoset lens forming, the advantages of such treatment may equally apply to thermoset optical manufacturing.

As PC resin does not adhere to the PET film very well under normal injection parameters, experiments were designed and performed to treat the surface of the PET film to adhere to the PC lens substrate to an acceptable level. A number of different treatments were experimented with and adhesion was tested with each. Adhesion was roughly judged first by probing with a razor blade at the edge of the lens at the PET film/lens junction. If the blade could not be forced between the layers, testing was performed by the narrow cross-section bend test described above.

| Treatment | Result |
| --- | --- |
| 1. Chemical Treat: Acetone. | No increase in adhesion/fail |
| 2. Chemical Treat: Heptane. | No increase in adhesion/fail |
| 3. Chemical Treat: 10% Sodium Hydroxide. | No increase in adhesion/fail |
| 4. Chemical Treat: Loctite 770 Adhesion | No increase in |

| Treatment | Result |
| --- | --- |
| Promoter. | adhesion/fail |
| 5. Chemical Treat: Ethyl Benzene. | No increase in adhesion/fail |
| 6. Chemical Treat: Toluene. | No increase in adhesion/fail |
| 7. Physical Treat: CR-Scrub. | No increase in adhesion/fail |
| 8. Low Level UV: Hand held plasma treater. | No increase in adhesion/fail |
| 9. Chemical Treat: Polyurethane coating; cured | No increase in adhesion/fail |
| 10. Chemical Treat: Polyurethane coating; uncured | Large increase in adhesion/PASSES bend test |

EXAMPLE 4

Example 4 demonstrates the advantages allowed by surface treating the lens/film prior to the optional hardcoating step. Although optional, ophthalmic lenses are generally hardcoated for improved abrasion resistance of at least the front surface of the lens. This step may be particularly important for PC lenses because the softer material is easily scratched even in packaging and transport. Accordingly, Example 4 is primarily directed to thermoplastic lens forming, however, it also demonstrates the advantages of treating the lens surface of a thermoset lens should this lens be hardcoated.

The inventors discovered that current commercially available ultraviolet light-cured hardcoating solutions had little if any adhesion to the PET film. Coatings from three different companies were tried without success, under a standard range of process conditions. In addition, PET lens samples were sent to SDC Coatings, Inc. for further experimentation to determine a proper hardcoat solution. The results of the SDC experiments suggested that they had no suitable hardcoating solutions for PET film.

Experiments were then designed and performed to treat the surface of the PET film to adhere the hardcoat solution to an acceptable level. The following experiments were run using both an SDC hardcoat (SDC-1175) for PC or acrylic lenses, and an LTI UV-cured hardcoat (LTI-SHC-175Y, 33% solids) commercially available and used for hard resin lenses. It was determined that the LTI hardcoat had a better affinity to PET than the SDC coating. The preferred method for best adhesion involved the following steps: the PET film was molded to the PC substrate, then treated with a D-brand lamp that exposed the sample to ultraviolet radiation. The lens was then hardcoated with LTI solution followed by UV curing of the coating with a D lamp.

Adhesion was tested by cross-hatch cutting the hardcoated surface, pressing 3M-brand 810 tape firmly across the cut region and quickly pulling the tape from the surface. An improvement in adhesion is indicated if less material is removed from the cross-hatched region, but a "fail" is still recorded if any coating is removed from the squares of the cross-hatch.

Other surface treatments were investigated, and their results are summarized below:

| Treatment | Result |
| --- | --- |
| 1. Chemical Treat: Acetone. | No increase in adhesion/fails tape test |
| 2. Chemical Treat: Isopropanol. | No increase in adhesion/fails tape test |
| 3. Chemical Treat: Heptane. | Slight increase in adhesion/fails tape test |
| 4. Chemical Treat: 10% Sodium Hydroxide. | No increase in adhesion/fails tape test |
| 5. Chemical Treat: Loctite 770 Adhesion. Promoter. | No increase in adhesion/fails tape test |
| 6. Chemical Treat: Ethyl Benzene. | No increase in adhesion/fails tape test |
| 7. Chemical Treat: Toluene. | No increase in adhesion/fails tape test |
| 8. Physical Treat: CR-Scrub. (metal oxides in surfactant/detergent mix) | Moderate increase in adhesion/fails tape test |
| 9. Low level UV exposure: Hand held plasma treater. | No increase in adhesion/fails tape test |
| 10. Moderate UV exposure: Hplus-brand mercury lamp. | Moderate increase in adhesion/fails tape test |
| 11. Higher near-UV exposure: D-brand lamp. | Large increase in adhesion/PASSES tape test |

Accordingly, a PET polarized optical-quality part such as an ophthalmic lens and methods of polarized ophthalmic lens manufacture are disclosed, wherein the manufacturing process integrally bonds the PET film to the lens substrate and optional hard coating without losing its required physical properties. While preferred embodiments are disclosed herein, many variations are possible which remain within the concept and scope of the invention. Such variations would become clear to one of ordinary skill in the art after inspection of the specification and drawings herein. The inventions therefore are not to be restricted except within the spirit and scope of the appended claims.

What is claimed is:

1. An optical-quality polarized part comprising:
   an optical construct;
   a polarizing film comprising polyethylene terephthalate, wherein the film is integrally bonded to the optical construct; and
   a hard coating integrally bonded to the film.

2. An optical-quality polarized part according to claim 1, wherein the optical construct is selected from the group consisting of semi-finished, finished prescription and non-prescription lenses, facemasks, shields, goggles, visors, displays, and window devices.

3. An optical-quality polarized part according to claim 1, wherein the optical construct is made from a copolymer comprising urethanes.

4. An optical-quality polarized part according to claim 1, wherein the optical construct is comprised of a hard resin thermoset material.

5. An optical-quality polarized part according to claim 4, wherein the hard resin thermoset material comprises a diallyl diglycol carbonate.

6. An optical-quality polarized part according to claim 1, wherein the optical construct is comprised of a thermoplastic material.

7. An optical-quality polarized part according to claim 6, wherein the thermoplastic material comprises polycarbonate.

8. An optical-quality polarized part according to claim 1, wherein the film further comprises a crystalline or semi-crystalline naphthalene dicarboxylic acid polyester.

9. An optical-quality polarized part comprising:
   an optical construct;
   a polarizing film comprising polyethylene terephthalate, wherein the film is integrally bonded to the optical construct; and
   a hard coating integrally bonded to the construct.

10. An optical-quality polarized part according to claim 9, wherein the optical construct is an ophthalmic lens.

11. A method of optical-quality polarized part manufacture utilizing a polyethylene terephthalate polarizing film comprising the steps of:
    treating a surface of a polyethylene terephthalate polarizing film;
    forming an optical-quality part with the film at or near a front surface of an optical construct, wherein the film is integrally bonded to the optical construct; and
    integrally bonding a hard coating to at least one of the film and the optical construct.

12. A method of optical-quality polarized part manufacture according to claim 11 further comprising the step of forming the film to a curved shape prior to the step of treating a surface of a polyethylene terephthalate polarizing film.

13. A method of optical-quality polarized part manufacture according to claim 11, wherein the step of treating a surface of a polyethylene terephthalate polarizing film includes coating the film with a polyurethane-based material.

14. A method of optical-quality polarized part manufacture according to claim 13, wherein the polyurethane-based material is uncured.

15. A method of optical-quality polarized part manufacture according to claim 11, wherein the step of treating a surface of a polyethylene terephthalate polarizing film includes irradiating the film.

16. A method of optical-quality polarized part manufacture according to claim 15, wherein the film is irradiated using UV, near UV, or visible irradiation.

17. A method of optical-quality polarized part manufacture according to claim 11, wherein the step of treating a surface of a polyethylene terephthalate polarizing film includes subjecting the surface of the film to plasma exposure.

18. A method of optical-quality polarized part manufacture according to claim 11, further comprising treating a surface of a polyethylene terephthalate polarizing film prior to applying a hardcoat thereon.

19. A method of optical-quality polarized part manufacture according to claim 18, wherein the step of treating a surface of the film prior to applying the hard coating thereon comprises UV irradiation.

20. A method of optical-quality polarized part manufacture according to claim 18, wherein the step of treating a surface of the film prior to applying the hard coating thereon comprises plasma exposure.

21. A method of optical-quality polarized part manufacture according to claim 18, wherein the step of treating a surface of the film prior to applying the hard coating thereon includes coating the surface of the film with a layer having reactive groups.

22. A method of optical-quality polarized part manufacture according to claim 21, wherein the step of treating a surface of the film prior to applying the hard coating thereon includes applying a coating of polysiloxanes.

23. A method of optical-quality polarized part manufacture according to claim 18, wherein the step of treating a surface of the film for applying a hard coating thereon includes coating a surface of the film with a layer having reactive —OH groups.

24. A method of optical-quality polarized part manufacture according to claim 18, wherein the step of treating a surface of the film for applying a hard coating thereon comprises exposing the film to a diluted caustic wash having less than or about 5% is NaOH.

25. A method of optical-quality polarized part manufacture according to claim 11, wherein the optical construct is comprised of a hard resin thermoset material.

26. A method of optical-quality polarized part manufacture according to claim 25, wherein the hard resin thermoset material comprises a diallyl diglycol carbonate.

27. A method of optical-quality polarized part manufacture according to claim 11, wherein the optical construct is comprised of a thermoplastic material.

28. A method of optical-quality polarized part manufacture according to claim 27, wherein the thermoplastic material comprises polycarbonate.

29. A method of optical-quality polarized part manufacture according to claim 11, wherein the film further comprises a crystalline or semi-crystalline naphthalene dicarboxylic acid polyester.

30. A method of optical-quality polarized part manufacture according to claim 11, wherein the optical construct is selected from the group consisting of semi-finished, finished prescription and non-prescription lenses, facemasks, shields, goggles, visors, displays, and window devices.

31. A method of optical-quality polarized part manufacture according to claim 11, wherein the optical construct is made from a copolymer comprising urethanes.

* * * * *